United States Patent
Graab et al.

(10) Patent No.: US 6,709,732 B1
(45) Date of Patent: Mar. 23, 2004

(54) WEB-TYPE FLOOR COVERING AND METHOD FOR ITS MANUFACTURE

(75) Inventors: Gerhard Graab, Mannheim (DE); Klaus Heckel, Gorxheimertal (DE); Dieter Rischer, Abtsteinach (DE); Gerhard Heidecke, Bensheim (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/542,234

(22) Filed: Apr. 4, 2000

(30) Foreign Application Priority Data

Apr. 8, 1999 (DE) .......................... 199 15 729

(51) Int. Cl.[7] ................................. B32B 5/16

(52) U.S. Cl. ...................... 428/143; 428/144; 428/148; 428/147; 428/328; 428/327; 428/492; 428/493; 428/403; 428/407

(58) Field of Search ................. 428/143, 144, 428/148, 147, 328, 327, 492, 493, 403, 407

(56) References Cited

U.S. PATENT DOCUMENTS

| | | | |
|---|---|---|---|
| 3,164,645 A | | 1/1965 | de Vries et al. |
| 3,901,688 A | * | 8/1975 | Casey et al. ............... 428/687 |
| 3,969,458 A | | 7/1976 | Hunter |
| 4,826,638 A | | 5/1989 | Hopperdietzel |
| 5,198,160 A | | 3/1993 | Chiu |
| 5,358,993 A | | 10/1994 | Timm et al. |
| 5,439,625 A | | 8/1995 | Schmidt et al. |
| 5,603,367 A | | 2/1997 | Watanabe |
| 5,787,655 A | * | 8/1998 | Saylor, Jr. .................. 428/149 |
| 6,221,462 B1 | * | 4/2001 | Graab et al. ............... 428/143 |

FOREIGN PATENT DOCUMENTS

| | | |
|---|---|---|
| DE | 1 509 879 | 5/1969 |
| DE | 31 17 183 | 11/1982 |
| DE | G 88 12 749.4 | 4/1989 |
| DE | 39 42 505 | 11/1990 |
| DE | 40 27 268 | 7/1991 |
| DE | 44 05 589 | 1/1995 |
| DE | 43 40 478 | 6/1995 |
| DE | 196 49 708 | 2/1998 |
| DE | 197 55 626 | 6/1999 |
| EP | 0 433 563 | 6/1991 |
| EP | 0 512 197 | 11/1992 |
| FR | 853 876 | 3/1940 |
| FR | 1 167 760 | 11/1958 |
| FR | 2 700 570 | 7/1994 |
| GB | 736009 | 8/1955 |
| GB | 2 291 649 A * | 1/1996 |
| GB | 2 298 388 | 9/1996 |
| JP | 62-37155 | 2/1987 |
| JP | 63-77955 | 4/1988 |
| JP | 63-201047 | 8/1988 |
| JP | 5-141075 | 6/1993 |
| JP | 6-6047 | 1/1994 |
| JP | 6-92706 | 4/1994 |
| JP | 6-108629 | 4/1994 |
| WO | WO 94/15772 | 7/1994 |

* cited by examiner

*Primary Examiner*—William P. Watkins, III
(74) *Attorney, Agent, or Firm*—Kenyon & Kenyon

(57) ABSTRACT

A web-type floor covering made of vulcanized rubber that includes an elastic rubber web, the top side of which forms a decorative surface, first decorative particles being at least partially embedded in the rubber web so that the first decorative particles are visible from the top side, a transparent coating, in particular made of epoxy resin, being applied to the first decorative particles on at least part of their contact surface with the rubber web, the first decorative particles being preferably made of a different material from that used for the rubber web.

17 Claims, 2 Drawing Sheets

WEB-TYPE FLOOR COVERING AND METHOD FOR ITS MANUFACTURE

TECHNICAL FIELD

The present invention relates to a web-type floor covering made of vulcanized rubber that includes an elastic rubber web, whose top side forms a decorative surface, first decorative particles being at least partially embedded in the rubber web so that the first decorative particles are visible from the top side.

BACKGROUND OF THE INVENTION

A web-type floor covering of this kind is described in German Patent 39 42 505 C1. German Patent 39 42 505 C1 proposes that particles made of ground rubber stock be used as the decorative particles. Herein, good adhesion between the decorative particles and the rubber web can be achieved. However, if a different material is used for the decorative particles instead of ground rubber stock, when rubbing tests are performed they indicate that decorative particles of this kind do not adhere satisfactorily to the rubber web and therefore may become detached when subjected to frictional loads.

SUMMARY OF THE INVENTION

The object of the present invention is therefore to improve adhesion between the decorative particles and the rubber web and thus ensure that a minimum of decorative particles are detached. According to the present invention, this object is achieved as follows: A transparent coating, in particular made of epoxy resin, is applied to a given first decorative particle on at least part of its contact surface with the rubber web, the first decorative particles preferably being made of a different material from that used for the rubber web. Thanks to the coating, which may be applied to the entire contact surface or just parts thereof, materials that would otherwise not form a lasting and friction-resistant bond with the rubber web can be used for the decorative particles. Thus the present invention allows one to use novel materials for the decorative particles of a floor covering made of rubber, so that novel aesthetic effects can be achieved. The manufacturing processes are straightforward, provided epoxy resin is used; in addition, the decorative particles adhere well and lastingly.

According to a further refinement of the present invention, the first decorative particles are at least partly made of a highly light-reflective material. According to the present invention, particles that have a sparkling, i.e., metallic or quasi-metallic, appearance can be used for the first time for a floor covering made of rubber, because it is thanks to the coating that they form a strong bond with the rubber surface.

In particular, strong adhesion can be achieved if the coated first decorative particles are made of corundum, silicon carbide and/or aluminum. Coated aluminum particles can in particular be used as aluminum spangles, which can be manufactured by fragmenting an aluminum foil coated with epoxy resin. The advantage of aluminum is that it is relatively soft, which means the floor covering is easy to cut.

Adhesion can be further improved if the first decorative particles are not regularly shaped. Alternatively, according to the present invention, regularly shaped decorative particles, e.g., having a square, rectangular or circular basal plane, may be permanently bonded to the rubber surface.

To achieve a largely flat surface, it is advantageous if the height of at least part of the first decorative particles is not as great as their longitudinal and transverse dimensions.

Furthermore, according to the present invention, the size of the first decorative particles is between 0.05 and 5 mm, preferably between 0.25 mm and 0.70 mm. The size of the decorative particles can be determined using a microscope, or via screen analysis.

Furthermore, according to the present invention, the coating, in particular the epoxy resin, is applied to the first decorative particles and cured, and the particles are then applied to the top surface of an uncured rubber web, and the rubber web is then vulcanized.

Furthermore, according to the present invention, second decorative particles made of rubber and having no coating may be used.

Furthermore, the present invention relates to a method for manufacturing a web-type floor covering having the following steps:

Preparation of decorative particles, a coating, in particular made of epoxy resin, having being applied in advance to at least part of the particles; preparation of an uncured rubber web having a top side; application of the decorative particles to the top side, in particular via scattering; attachment of the decorative particles to the rubber web via application of pressure; and vulcanization of the rubber web having the decorative particles.

Furthermore, the present invention relates to the use of decorative particles coated with epoxy resin in the manufacture of an elastic floor covering made of rubber.

BRIEF DESCRIPTION OF THE DRAWINGS

An exemplary embodiment of the present invention is shown in the drawings, in which.

DETAILED DESCRIPTION OF THE PRESENT INVENTION

Figure 1:
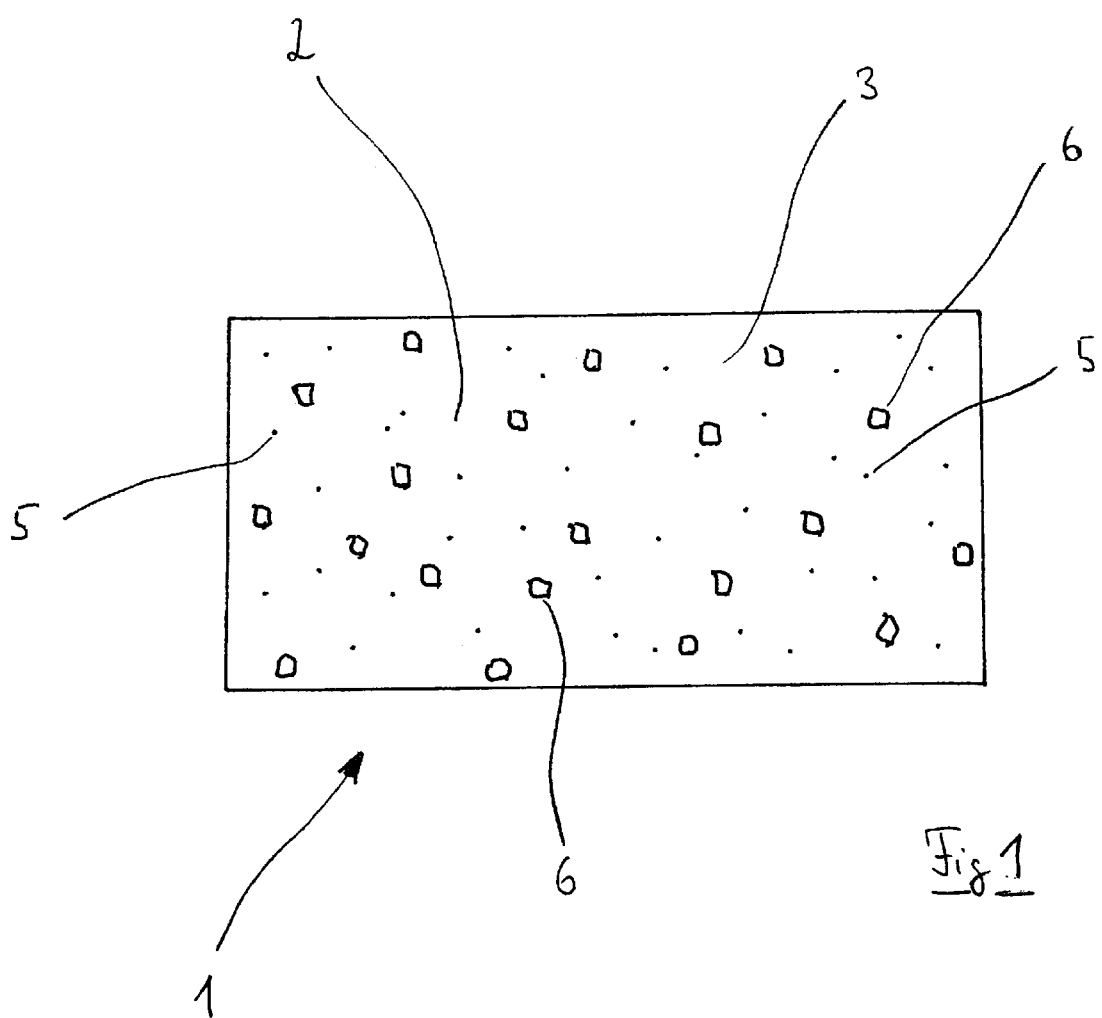
FIG. 1 is a top plan view of a floor covering according to the present invention.
Figure 2:
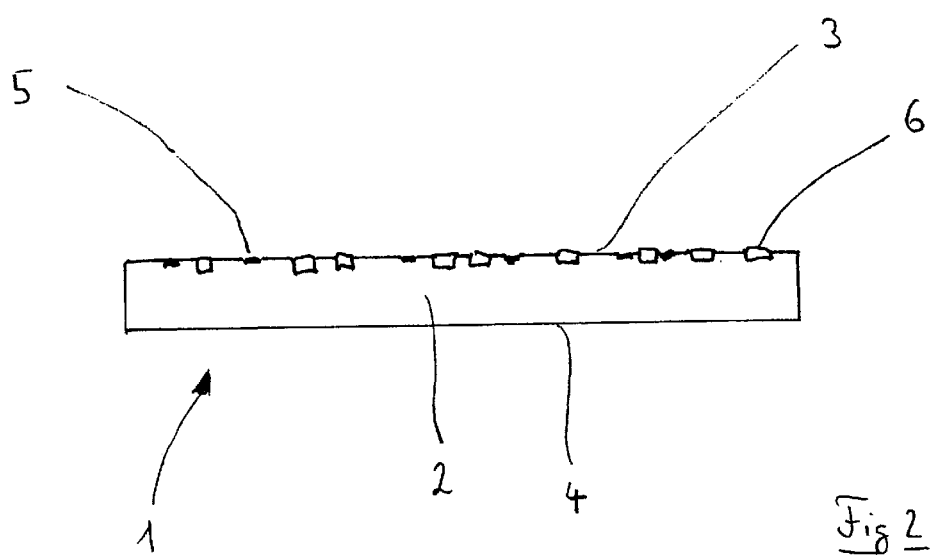
FIG. 2 is a cross-sectioned view taken through a floor covering according to the present invention.

FIGS. 1 and 2 schematically depict a web-type floor covering 1, which is essentially formed from rubber web 2, the top surface 3 of which provides forms a decorative surface. Bottom surface 4 of floor covering 1 is placed on the floor to be covered and can, for example, be permanently bonded to it via adhesive bonding.

First and second decorative particles 5, 6 are embedded in rubber web 2 so that decorative particles 5, 6 are visible from top side 3. Herein, first and second decorative particles 5, 6 are arranged on the surface of the rubber web so that they form part of the surface of floor covering 1.

First decorative particles 5 are made of a highly light-reflective material, e.g., corundum, silicon carbide, aluminum, or a mixture of various different materials. Highly light-reflective first decorative particles 5 give floor covering 1 a variable sparkling appearance when it is viewed from different angles. A coating made of epoxy resin is applied to decorative particles 5. The coating is transparent, and in particular is clear and may be colored to produce color effects. If first particles 5 are made of aluminum, one can manufacture them particularly easily by first coating an aluminum foil with epoxy resin and then fragmenting it. The epoxy resin may also be applied to first decorative particles 5 via other methods, e.g., via spraying or immersion. First decorative particles 5 are made of a material that is not rubber and is thus different from the material used for rubber web 2.

First decorative particles 5 may be regularly shaped, e.g., they may have a square, rectangular, or circular basal plane. The height of first decorative particles 5 is not as great as their longitudinal and transverse dimensions. The size of a given first decorative particle 5 is between 0.05 and 5 mm, preferably between 0.25 mm and 0.70 mm.

Second decorative particles 6 are made of rubber. Second decorative particles 6 of this kind form a strong bond with rubber web 2 even without an epoxy resin coating; second decorative particles 6 therefore do not require an epoxy resin coating. The size of second decorative particles 6 is between 0.3 mm and 1.5 mm, preferably between 0.5 mm and 1.0 mm, this being determined via screen analysis.

The rubber mixture for rubber web 2 and/or second decorative particles 6 may be manufactured from a rubber mixture that is known heretofore. An example of a rubber mixture of this kind is shown below:

| | |
|---|---|
| Styrene/butadiene rubber (styrene content: 23%) | 100 parts |
| Styrene/butadiene copolymer (styrene content: 85%) | 20 parts |
| Precipitated silicic acid | 40 parts |
| Kaolin | 70 parts |
| Precipitated chalk | 30 parts |
| Coumarone-indene resin | 15 parts |
| Zinc oxide | 5 parts |
| Stearic acid | 1.5 parts |
| Sulfur | 2.5 parts |
| Polyethylene glycol | 3.0 parts |
| Cyclohexylbenzthiazylsulfenamide | 2.7 parts |
| Tetramethylthiuram disulfide] | 0.5 parts |

Second decorative particles 6 may be created by fragmenting a vulcanized and in particular web-type rubber mass. However, they may also be made of unvulcanized rubber particles, which may be either single-colored or multi-colored.

The floor covering according to the present invention is manufactured via the following steps. First, first decorative particles 5 are prepared, epoxy resin having being applied in advance to at least part of the particles. Furthermore, uncured calendered rubber web 2 is prepared. First decorative particles 5 and if necessary second decorative particles 6 are applied to the top side thereof. This may be accomplished by scattering the decorative particles. After that, decorative particles 5, 6 are attached to rubber web 2 via application of pressure, the decorative particles being, for example, pressed into rubber web 2 by a heated steel cylinder until they are at least partially embedded. Finally, rubber web 2 having decorative particles 5, 6 is vulcanized, decorative particles 5, 6 thus being permanently bonded to the surface of rubber web 2. Alternatively, decorative particles 5, 6 can be mixed into rubber web 2 before calendering, so that they are provided not just on its top side but distributed throughout its entire cross section. This means that the appearance of the upper layer of the floor covering does not change even if it is subject to wear and tear.

An adhesion test of decorative particles 5, 6 can be carried out as follows: The decorative side 3 of a piece of floor covering measuring 10×10 cm is rubbed against the decorative side of a second similarly dimensioned piece. Herein, to pass the test, it is necessary that no more than a few decorative particles, or no particles at all, become detached from rubber web 2. Herein, the floor coverings according to the present invention display excellent values, so that they may be used even if the floor in question is subject to intensive use, e.g., in public buildings.

What is claimed is:

1. A web-type floor covering comprising:

a vulcanized rubber web having a top side that provides a decorative surface;

a plurality of first decorative particles that are at least partially embedded in the rubber web along contact surfaces with the rubber web, the first decorative particles being visible from the top side;

wherein a transparent coating coats the first decorative particles on at least part of the contact surface between the rubber web and the decorative particles, the first decorative particles made of a different material from that used for the rubber web, and wherein the plurality of first decorative particles are made of ground aluminum foil.

2. The floor covering according to claim 1, wherein the first decorative particles are at least partly made of a highly light-reflective material.

3. The floor covering according to claim 1, wherein the first decorative particles are irregularly shaped.

4. The floor covering according to claim 1, wherein the first decorative particles are irregularly shaped.

5. The floor covering according to claim 1, wherein the first decorative particles have a height as well as transverse and longitudinal dimensions, and the height of at least part of the first decorative particles is not as great as their longitudinal and transverse dimensions.

6. The floor covering according to claim 1, wherein the size of the first decorative particles (5) is between 0.05 and 5 mm.

7. The floor covering according to claim 5, wherein the size of the first decorative particles (5) is between 0.05 and 5 mm.

8. The floor covering according to claim 1, wherein the coating is applied to the first decorative particles and cured, and these are then applied to the top side of an uncured rubber web, and the rubber web is then vulcanized.

9. The floor covering according to claim 1, wherein the coating is applied to the first decorative particles and cured, and these are then applied to the top side of an uncured rubber web, and the rubber web is then vulcanized.

10. Floor covering according to claim 1, wherein second decorative particles made of rubber and having no coating are provided.

11. Floor covering according to claim 7, wherein second decorative particles made of rubber and having no coating are provided.

12. The floor covering according to claim 1, wherein the transparent coating is an epoxy resin.

13. The floor covering according to claim 1, wherein the coating includes an epoxy resin.

14. The floor covering according to claim 1, wherein the size of the first decorative particles is between 0.25 mm and 0.70 mm.

15. The floor covering according to claim 5, wherein the size of the first decorative particles is between 0.25 mm and 0.70 mm.

16. The floor covering according to claim 13, wherein the epoxy resin is applied to the first decorative particles and cured, and these are then applied to the top side of an uncured rubber web, and the rubber web is then vulcanized.

17. The floor covering according to claim 1, wherein the coating includes an epoxy resin, and the epoxy resin is applied to the first decorative particles and cured, and these are then applied to the top side of an uncured rubber web, and the rubber web is then vulcanized.

* * * * *